(12) United States Patent
Mu et al.

(10) Patent No.: US 10,876,043 B2
(45) Date of Patent: Dec. 29, 2020

(54) CHELATING AGENT FOR RESERVOIR ACIDIFICATION AND STIMULATING INJECTION AND ITS PREPARATION METHOD AND APPLICATION

(71) Applicant: PetroChina Company Limited, Beijing (CN)

(72) Inventors: Lijun Mu, Beijing (CN); Xianwen Li, Beijing (CN); Hongjun Lu, Beijing (CN); Yong Wang, Beijing (CN); Bin Yao, Beijing (CN); Zhenning Ji, Beijing (CN); Suiwang Zhang, Beijing (CN); Xiaobing Lu, Beijing (CN); Zhiying Deng, Beijing (CN); Lei SUi, Beijing (CN); Erzhen Wang, Beijing (CN); Zhaojie Song, Beijing (CN)

(73) Assignee: PetroChina Company Limited, Beijing (CN)

( * ) Notice: Subject to any disclaimer, the term of this patent is extended or adjusted under 35 U.S.C. 154(b) by 9 days.

(21) Appl. No.: 16/254,773

(22) Filed: Jan. 23, 2019

(65) Prior Publication Data

US 2019/0330519 A1    Oct. 31, 2019

(30) Foreign Application Priority Data

Apr. 28, 2018  (CN) .......................... 2018 1 03990942

(51) Int. Cl.
*C09K 8/74* (2006.01)
*C09K 8/72* (2006.01)
*E21B 43/25* (2006.01)

(52) U.S. Cl.
CPC .............. *C09K 8/725* (2013.01); *E21B 43/25* (2013.01)

(58) Field of Classification Search
CPC .......... C09K 8/725; C09K 8/74; C09K 8/528; C09K 2208/12; C09K 8/72; C09K 8/54; C09K 2208/32; C09K 8/52; C09K 8/68; C09K 2208/10; C09K 2208/28; C09K 8/12; C09K 8/584; C09K 8/602; C09K 8/604; C09K 8/70; C09K 8/80; C09K 8/86; C09K 8/92; C09K 8/032; C09K 8/035; C09K 8/28; C09K 8/40; C09K 8/506; C09K 8/57; C09K 8/575; C09K 8/62; C09K 8/78; C09K 8/885; C09K 13/06; C09K 17/40; C09K 17/42; C09K 17/48; C09K 2208/04; C09K 2208/20; C09K 2208/22; C09K 2208/26; C09K 8/02; C09K 8/03; C09K 8/04; C09K 8/10; C09K 8/32; C09K 8/36; C09K 8/424; C09K 8/426; C09K 8/467; C09K 8/502; C09K 8/5045; C09K 8/5083; C09K 8/524; C09K 8/536; C09K 8/565; C09K 8/572; C09K 8/5753; C09K 8/58; C09K 8/588; C09K 8/594; C09K 8/605; C09K 8/66; C09K 8/685; C09K 8/703; C09K 8/82; C09K 8/882; C09K 8/887; C09K 8/94; E21B 43/26; E21B 23/01; E21B 43/16; E21B 43/267; E21B 23/04; E21B 33/12; E21B 33/128; E21B 43/25; E21B 17/028; E21B 21/003; E21B 37/06; E21B 49/08; E21B 17/042; E21B 19/24; E21B 23/065; E21B 33/1208; E21B 33/1291; E21B 33/13; E21B 33/134; E21B 43/04; E21B 44/02; E21B 44/04; E21B 45/00; E21B 49/00; E21B 49/003; E21B 7/04; E21B 17/003; E21B 21/10; E21B 21/103; E21B 2200/01; E21B 2200/22; E21B 23/00; E21B 23/001; E21B 33/1243; E21B 33/1285; E21B 33/129; E21B 33/1293; E21B 33/1295; E21B 33/138; E21B 33/14; E21B 33/16; E21B 34/10;
(Continued)

(56) References Cited

U.S. PATENT DOCUMENTS 9,315,712 B2 *  4/2016  Van Zanten ............ C04B 28/02
9,803,134 B2   10/2017  De Wolf et al.
(Continued)

FOREIGN PATENT DOCUMENTS

CN    102453480 A    5/2012
CN    105602540 A    5/2016
(Continued)

OTHER PUBLICATIONS

Chinese Patent Office Action and Search Report for Application No. 201810399094.2 dated Mar. 30, 2020 (16 pages, English translation included).
Z. He et al., "Synthesis of NTS Chelating Agent and its Desulfurization Synergistic Effect Evaluation with EDTA Coordination Iron", Chemical Industry and Engineering Progress, vol. 33, No. 8, pp. 2170-2173 (2014).
(Continued)

*Primary Examiner* — Kumar R Bhushan
(74) *Attorney, Agent, or Firm* — Michael Best and Friedrich LLP

(57) ABSTRACT

A chelating agent may be used for reservoir acidification and stimulating injection. The raw material composition of the chelating agent comprises: 10.0%-20.0% of methanesulfonic acid, 10.0%-20.0% of methanol, 10.0%-20.0% of polyaspartic acid, 10.0%-15.0% of epoxy succinic acid, 5.0%-10.0% of sodium cetyl sulfonate, 10.0%-15.0% of cetyltrimethylammonium bromide and the balance of water. The present disclosure also provides a preparation method of the above chelating agent. The chelating agent for reservoir acidification and stimulating injection may be used in an acidizing and stimulating injection process, wherein it can effectively dissolve rock cracks, be used directly without need to be reversed.

11 Claims, No Drawings

(58) Field of Classification Search
CPC .......... E21B 34/12; E21B 34/14; E21B 37/00;
E21B 41/00; E21B 41/0085; E21B 41/02;
E21B 43/103; E21B 43/108; E21B
43/116; E21B 43/119; E21B 43/12; E21B
43/126; E21B 43/2405; E21B 43/385;
E21B 47/00; E21B 47/002; E21B 47/107;
E21B 47/12; E21B 47/14; E21B 4/02
See application file for complete search history.

(56) References Cited

U.S. PATENT DOCUMENTS

| | | | | |
|---|---|---|---|---|
| 2008/0312124 | A1* | 12/2008 | Ina | C11D 3/33 |
| | | | | 510/480 |
| 2018/0105486 | A1* | 4/2018 | Stamm | C07C 227/30 |

FOREIGN PATENT DOCUMENTS

| | | | |
|---|---|---|---|
| CN | 106479467 | A | 3/2017 |
| CN | 106609134 | A | 5/2017 |
| CN | 106809961 | * | 6/2017 |
| CN | 106833576 | A | 6/2017 |
| WO | 2017120485 | A1 | 7/2017 |

OTHER PUBLICATIONS

Z. Tang et al., "Preparation and Property of Sulfate Scale Removing Agent", Oilfield Chemistry, vol. 32, No. 4, pp. 607-609,627 (Dec. 25, 2015).
Chinese Novelty Search Report dated Apr. 4, 2018.

\* cited by examiner

CHELATING AGENT FOR RESERVOIR ACIDIFICATION AND STIMULATING INJECTION AND ITS PREPARATION METHOD AND APPLICATION

CROSS REFERENCES TO RELATED APPLICATIONS

The present invention contains subject matter related to Chinese Patent Application No.: 2018103990942, filed Apr. 28, 2018, of which the entire contents are hereby incorporated by reference in the present application.

TECHNICAL FIELD

The invention relates to a chelating agent and a preparation method thereof, in particular to a chelating agent used for reservoir acidification process and a preparation method thereof, which belongs to the technical field of petroleum exploitation.

BACKGROUND

The acidizing technique is one of the widely used means to increase production of oil and gas well, which can effectively remove the damage to the reservoir after the completion of the drilling and during the producing process, and increase the oil and gas production.

Conventional acidification comprises: injecting a formula acid solution consisted of certain types and concentrations of acid and additives into the reservoir in a certain order, dissolving some minerals in the formation rock or plugs in the pores and cracks, and improving the permeability of the formation or cracks and the seepage conditions to achieve the purpose of restoring or improving the productivity of oil and gas wells.

At present, the widely used acid solution system is mainly a compounded formula of hydrochloric acid, mud acid, hydrofluoric acid and the like with additives, and these acid solution systems have been implemented for a long time, and have achieved certain results. However, the conventional acidizing treatment operation requires the on-site preparation of the required acid solution according to the actual process requirements on site, and then the performing of the process procedures such as pre-liquid, treatment liquid and post-liquid. Due to the complicated operation process and limited operation conditions on site, the transportation cost of equipment is high and the labor intensity is high. Therefore, it is necessary to provide an acidification modification solution which can be directly used, without need of on-site preparation, and has a simple operation process and excellent modification effect.

SUMMARY

In order to solve the above technical problems, the object of the present invention is to provide an acid solution which can effectively dissolve rock cracks, be used directly without need to be reversed, and simultaneously has the three functions of pre-liquid, treatment liquid and post-liquid.

In order to achieve the above technical object, the present invention provides a chelating agent for reservoir acidification and stimulating injection, wherein the raw material composition of the chelating agent comprises: 10.0%-20.0% of methanesulfonic acid, 10.0%-20.0% of methanol, 10.0%-20.0% of polyaspartic acid, 10.0%-15.0% of epoxy succinic acid, 5.0%/10.0% of sodium cetyl sulfonate, 10.0%-15.0% of cetyltrimethylammonium bromide and the balance of water, based on 100% of the total mass of the chelating agent for reservoir acidification and stimulating injection, the sum of mass percentages of each raw material in the chelating agent for reservoir acidification and stimulating injection is 100%.

Preferably, in the above chelating agent, the chelating agent for reservoir acidification and stimulating injection has a inhibition rate of calcium fluoride precipitation of more than 90%, a inhibition rate of fluorosilicate precipitation of more than 85%, a dissolution rate per unit volume of barium sulfate precipitation and strontium sulfate precipitation of more than 40%, and a dissolution rate per unit volume of calcium carbonate scale is greater than 90%, and after use, the interfacial tension of the reservoir surface can be as small as $10^{-3}$.

In the chelating agent of the present invention, preferably, the chelating agent has 15% of methanesulfonic acid in its raw material composition.

In the chelating agent of the present invention, preferably, the chelating agent has 2% of methanol in its raw material composition.

In the chelating agent of the present invention, preferably, the chelating agent has 18% of polyaspartic acid in its raw material composition; more preferably, the relative molecular mass of polyaspartic acid used is 2000-3500.

In the chelating agent of the present invention, preferably, the chelating agent has 12% of epoxy succinic acid in its raw material composition.

In the chelating agent of the present invention, preferably, the chelating agent has 7% of sodium cetyl sulfonate in its raw material composition.

In the chelating agent of the present invention, preferably, the chelating agent has 13% of cetyltrimethylammonium bromide in its raw material composition.

The invention also provides a preparation method of the above chelating agent, comprising the following steps:

adding successively polyaspartic acid, epoxy succinic acid, sodium cetyl sulfonate, cetyltrimethylammonium bromide, water to methanesulfonic acid at 15° C. to 25° C., and stirring; and adding methanol and stirring to obtain the chelating agent for reservoir acidification and stimulating injection.

The chelating agent for reservoir acidification and stimulating injection of the present invention is used in an acidizing and stimulating injection process. When the chelating agent for reservoir acidification and stimulating injection is used in an acidizing and stimulating injection process, it is directly added to the acid solution, at a proportion of 10%-15% of the volume of the acid solution.

According to a particular embodiment of the present invention, the acid solution here is mainly composed of polyhydrogen retarding acid.

The chelating agent for reservoir acidification and stimulating injection of the present invention is used in an acidizing and stimulating injection process. In the chelating agent, a hetero atom having large electro-negativity, such as N, O, and the like, and electron pairs those are not shared on the hetero atom form a bond with the d-orbit lacking electron of a metal via feedback, and form a complex with the metal element, thereby reducing secondary precipitation.

The chelating agent for reservoir acidification and stimulating injection of the present invention can effectively inhibit the secondary precipitation of calcium fluoride and fluorosilicate, wherein the inhibition rate of calcium fluoride precipitation is greater than 90%, and the inhibition rate of fluorosilicate precipitation is greater than 85%; and which can dissolve barium sulphate and strontium sulphate precipitation rapidly, and the dissolution rate per unit volume is greater than 40%.

The chelating agent for reservoir acidification and stimulating injection of the present invention can be directly used by adding in the acid solution system according to the on-site operation requirements, and does not need on-site preparation, and has three functions as possessed by the pre-liquid, treatment liquid and post-liquid. The three-step process is completed in one step.

The chelating agent for reservoir acidification and stimulating injection of the present invention can effectively dissolve the calcium carbonate scale of the reservoir, the dissolution rate per unit volume is more than 90%, and it can prevent the formation of new calcium carbonate scale.

The chelating agent for reservoir acidification and stimulating injection of the present invention can effectively reduce the interfacial tension of the reservoir surface, and the interfacial tension of the surface can be as small as $10^{-3}$.

The chelating agent for reservoir acidification and stimulating injection of the present invention can effectively alleviate the swelling of the clay during the water injection development process, and plays the role of preventing swelling and shrinking.

Adding the chelating agent for reservoir acidification and stimulating injection of the present invention to the acid solution for acidizing treatment can effectively dissolve the cracks of the rock. The acid solution can be directly injected into the formation, without need to be reversed, and without the need of water injection pipe columns, which simplifies the operation process, saves the operation time, improves the operation efficiency, reduces the operating cost, safety risk and labor intensity, and improves the operation effect. It also prevents clay expansion during water injection development, which further improves the development of water flooding.

DETAILED DESCRIPTION

In order to understand the technical features, objects, and advantages of the present invention more clearly, the technical solutions of the present invention are described in detail below, which however should not to be construed as limiting the scope of the invention.

Example 1

The Example provides a chelating agent for reservoir acidification and stimulating injection, the raw material composition of the chelating agent for reservoir acidification and stimulating injection comprises: 15% of methanesulfonic acid, 18% of methanol, 12% of polyaspartic acid, 12% of epoxy succinic acid, 8% of sodium cetyl sulfonate, 10% of cetyltrimethylammonium bromide and the balance of water.

The Example further provides the preparation method of the above chelating agent for reservoir acidification and stimulating injection, comprising the following step:

adding polyaspartic acid, epoxy succinic acid, sodium cetyl sulfonate, cetyltrimethylammonium bromide, water to methanesulfonic acid at 15° C. to 25° C., and stirring the mixture; adding methanol and stirring the resultant to obtain the chelating agent for reservoir acidification and stimulating injection.

The above chelating agent of the example was tested indoor for its ability to inhibit precipitation, scale dissolution, and surface tension reduction.

(1) Determination of Calcium Fluoride Inhibition Rate

The filter paper was dried, and weighted as $m_1$ after drying. The filter device was prepared, the filter paper was laid, and 4 g of calcium chloride powder was weighed and put into the numbered plastic beaker. 20 g of 4.5.1.1 mud acid system (3% HF+10% HCl) was poured into the plastic beaker, and then the acid solution was dissolved in a 60° C. water bath for 30 minutes until dissolved completely, which was immediately filtered, dried, weighed, and recorded as $m_2$, and the data was recorded.

The dry filter paper $m_3$ was weighed, 4 g of calcium chloride powder was weighed, and placed in the numbered plastic beaker. 20 g of the chelating agent of the present example was poured into a plastic beaker, and then the acid solution was dissolved in a 60° C. water bath for 30 minutes until n dissolved completely, which was immediately filtered, dried, and weighed as $m_4$, and the data was recorded. The results are shown in Table 1.

Inhibition Rate of Calcium Fluoride:

$$v = \frac{(m_2 - m_1) - (m_4 - m_3)}{m_2 - m_1} \times 100\%$$

TABLE 1

Inhibition rate of the chelating agent to calcium fluoride precipitation

| Acid solution | Mass of filter paper (g) | Mass of filter paper + precipitation (g) | $CaF_2$ inhibition rate |
|---|---|---|---|
| Mud acid | 1.3217 | 1.6621 | — |
| Chelating agent | 1.3312 | 1.3526 | 93.71% |

(2) Study on the Inhibition Performance to Fluoroaluminate 5.0 g of acid solution system and 2.0 g of aluminum chloride solution (2 mol/L) were added to a 100 mL beaker, and 1 drop of phenolphthalein was added. The pH value was adjusted with 10% sodium hydroxide solution until the acid color changes, water was added to 100 mL engraved line, and the system was placed at room temperature for 0.5 h. Then the system was filtered, dried and weighed to calculate the inhibition rate of different chemicals on aluminum hydroxide (the blank is based on mud acid). The results are shown in Table 2.

$$w = \frac{m(\text{mud acid}) - m(\text{tested acid solution})}{m(\text{mud acid})} \times 100\%$$

TABLE 2

Inhibition rate of the chelating agent to fluoroaluminate precipitation

| Acid solution | Mass of filter paper (g) | Mass of filter paper + precipitation (g) | fluoroaluminate inhibition rate |
|---|---|---|---|
| Mud acid | 1.3143 | 1.4460 | — |
| Chelating agent | 1.3400 | 1.3575 | 86.7% |

(3) Dissolution Experiment of Calcium Carbonate Scale

The filter paper was dried, and weighted as $m_1$ after drying. The filter device was prepared, the filter paper was laid, and 1.00 g of calcium carbonate powder was weighed and recorded as $m_2$, and was put into the numbered plastic beaker. 10 g of acid solution system was poured into the plastic beaker, and the acid solution was put into a 60° C. water bath. After 2 h of reaction, the system was immediately filtered, dried, weighed and recorded as $m_3$. The data was recorded for calculating the dissolution rate. The results are shown in Table $$\eta = \frac{m_2 + m_1 - m_3}{m_2} \times 100\%$$

TABLE 3

Dissolution of the chelating agent to calcium carbonate scale

| Acid solution | Mass of scale | Mass of filter paper (g) | Mass of filter paper + precipitation (g) | Dissolution rate of calcium carbonate scale |
|---|---|---|---|---|
| Chelating agent | 1.0021 | 1.2800 | 1.3501 | 93.1% |

The test results of reducing the surface tension are shown in Table 4.

TABLE 4

The surface and interfacial tension of solution after adding the chelating agent

| Name | Surface tension (N/mN) | Interfacial tension (N/mN) |
|---|---|---|
| Chelating agent | 28.25 | 0.038 |

The above chelating agent of the present example was added to an on-line acidification system to form an on-line chelation acid system (10% of ammonium fluoride, 20% of hydrochloric acid, 5% of corrosion inhibitor, 12% of chelating agent, and the balance of water). On-line acidizing treatment of two wells in Changing Oilfield was performed. The implementation effect is shown in Table 5.

TABLE 5

Table of Changqing Oilfield on-site operation data

| | Pre-operation | | | | Post-operation | | | | |
|---|---|---|---|---|---|---|---|---|---|
| Well number | Oil pressure (MPa) | Casing pressure (MPa) | Injection allocation (m3) | Daily injection (m3) | Oil pressure (MPa) | Casing pressure (MPa) | Injection allocation (m3) | Daily injection (m3) | Effective days (d) |
| J8-57 | 21.0 | 19.6 | 20.0 | 7.0 | 14.0 | 13.8 | 30.0 | 30.0 | 286 |
| J81-49 | 18.9 | 18.0 | 15.0 | 5.0 | 12.7 | 12.7 | 20.0 | 20.0 | 298 |

The operation results show that after adding the above chelating agent of the present example, the on-line chelation acid system can effectively remove the blockage of the injection well formation, improve the fluid flow condition of the formation, improve the water injection capacity of the injection well, and reduce the injection pressure, and has good practical application value.

Example 2

The Example provides a chelating agent for reservoir acidification and stimulating injection, the raw material composition of the chelating agent for reservoir acidification and stimulating injection comprises: 18% of methanesulfonic acid, 15% of methanol, 15% of polyaspartic acid, 10.0% of epoxy succinic acid, 6% of sodium cetyl sulfonate, 12% of cetyltrimethylammonium bromide and the balance of water.

The above chelating agent of the Example was tested indoor for its ability to inhibit precipitation, scale dissolution, and surface tension reduction. The experimental data is shown in Table 6, Table 7, Table 8 and Table 9.

TABLE 6

Inhibition rate of the chelating agent to calcium fluoride precipitation

| Acid solution | Mass of filter paper (g) | Mass of filter paper + precipitation (g) | $CaF_2$ inhibition rate |
|---|---|---|---|
| Mud acid | 1.3217 | 1.6621 | — |
| Chelating agent | 1.3303 | 1.3567 | 92.5% |

TABLE 7

Inhibition rate of the chelating agent to fluorosilicate precipitation

| Acid solution | Mass of filter paper (g) | Mass of filter paper + precipitation (g) | $Na_2SiF_6$ inhibition rate |
|---|---|---|---|
| Mud acid | 1.3128 | 1.4386 | — |
| Chelating agent | 1.3321 | 1.3464 | 88.6% |

TABLE 8

Dissolution of the chelating agent to calcium carbonate scale

| Acid solution | Mass of scale | Mass of filter paper (g) | Mass of filter paper + precipitation (g) | Dissolution rate of calcium carbonate scale |
|---|---|---|---|---|
| Chelating agent | 1.0021 | 1.2800 | 1.3602 | 92% |

TABLE 9

The surface and interfacial tension of solution after adding the chelating agent

| Name | Surface tension (N/mN) | Interfacial tension (N/mN) |
|---|---|---|
| Chelating agent | 28.12 | 0.035 |

The above chelating agent of the present example was added to an on-line acidification system to form an on-line chelation acid system (12% of ammonium fluoride, 25% of hydrochloric acid, 3% of corrosion inhibitor, 10% of chelating agent, and the balance of water). On-line acidizing treatment of two wells in Changing Oilfield was performed. The implementation effect are shown in Table 10.

TABLE 10

| | Pre-operation | | | | Post-operation | | | | |
|---|---|---|---|---|---|---|---|---|---|
| Well number | Oil pressure (MPa) | Casing pressure (MPa) | Injection allocation (m³) | Daily injection (m³) | Oil pressure (MPa) | Casing pressure (MPa) | Injection allocation (m³) | Daily injection (m³) | Effective days (d) |
| L85-45 | 18.9 | 18.8 | 15.0 | 5.0 | 17.9 | 17.5 | 15.0 | 15.0 | 358 |
| Z296-6 | 21.9 | 21.2 | 18.0 | 9.0 | 20.6 | 20.2 | 18.0 | 30.0 | 364 |

The operation results show that after adding the above chelating agent of the present Example, the on-line chelation acid system can effectively remove the blockage of the injection well formation, improve the fluid flow condition of the formation, improve the water injection capacity of the injection well, and reduce the injection pressure, and has good practical application value.

The invention claimed is:

1. A chelating agent for reservoir acidification and stimulating injection, characterized in that a raw material composition of the chelating agent comprises:
    10.0%-20.0% of methanesulfonic acid,
    10.0%-20.0% of methanol,
    10.0%-20.0% of polyaspartic acid,
    10.0%-15.0% of epoxy succinic acid,
    5.0%-10.0% of sodium cetyl sulfonate,
    10.0%-15.0% of cetyltrimethylammonium bromide, and the balance of water, based on 100% of the total mass of the chelating agent for reservoir acidification and stimulating injection, wherein the sum of mass percentages of each raw material in the chelating agent for reservoir acidification and stimulating injection is 100%.

2. The chelating agent according to claim 1, characterized in that the raw material composition includes 15% methanesulfonic acid.

3. The chelating agent according to claim 1, characterized in that the raw material composition includes 12% methanol.

4. The chelating agent according to claim 1, characterized in that the raw material composition includes 18% polyaspartic acid.

5. The chelating agent according to claim 4, characterized in that a relative molecular mass of the polyaspartic acid is 2000-3500.

6. The chelating agent according to claim 1, characterized in that the raw material composition includes 12% epoxy succinic acid.

7. The chelating agent according to claim 1, characterized in that the raw material composition includes 7% sodium cetyl sulfonate.

8. The chelating agent according to claim 1, characterized in that, the raw material composition includes 13% cetyltrimethylammonium bromide.

9. A method for preparing the chelating agent for reservoir acidification and stimulating injection of claim 1, characterized in that the preparation method comprises:
    adding successively polyaspartic acid, epoxy succinic acid, sodium cetyl sulfonate, cetyltrimethylammonium bromide, water to methanesulfonic acid at 15° C. to 25° C., and stirring; and
    adding methanol and stirring to obtain the chelating agent for reservoir acidification and stimulating injection.

10. A method for reservoir acidification and stimulating injection, comprising: using the chelating agent according to claim 1 in an acidizing and stimulating injection process.

11. The method according to claim 10, further comprising:
    adding the chelating agent to an acid solution at a proportion of 10%-15% of a volume of the acid solution.

* * * * *